United States Patent [19]

Trema

[11] Patent Number: 5,156,231
[45] Date of Patent: Oct. 20, 1992

[54] SUSPENSION-CORRECTIVE DEVICE DESIGNED ESPECIALLY FOR A MOTORCYCLE

[75] Inventor: Daniel Trema, Bezons, France

[73] Assignee: Elf France, Courbevoie, France

[21] Appl. No.: 719,662

[22] Filed: Jun. 24, 1991

Related U.S. Application Data

[63] Continuation of Ser. No. 457,277, Dec. 27, 1989, abandoned.

[30] Foreign Application Priority Data

Dec. 27, 1988 [FR] France .................. 88 17222

[51] Int. Cl.$^5$ ............................................. B62K 25/00
[52] U.S. Cl. .................................... 180/227; 280/276; 280/279; 280/283; 180/219
[58] Field of Search ............... 180/219, 225, 226, 227; 280/275, 276, 277, 279, 283, 284, 285, 286, 703

[56] References Cited

U.S. PATENT DOCUMENTS

| | | | |
|---|---|---|---|
| 3,817,382 | 6/1974 | Hamilton | 180/227 |
| 3,989,261 | 11/1976 | Kawaguchi | 280/276 |
| 4,497,506 | 2/1985 | Miyakoshi | 280/703 |
| 4,533,153 | 8/1985 | Tsunoda et al. | 280/277 |
| 4,650,027 | 3/1987 | de Cortanze | 280/284 |
| 4,653,604 | 3/1987 | de Cortanze | 280/703 X |

FOREIGN PATENT DOCUMENTS 3133576 5/1983 Fed. Rep. of Germany .
57-155145 9/1982 Japan .
2052407 2/1980 United Kingdom .

OTHER PUBLICATIONS

European Search Report No. EP 89 40 3554–Mar. 4, 1990.

Primary Examiner—Charles A. Marmor
Assistant Examiner—Tamara L. Graysay
Attorney, Agent, or Firm—Burgess, Ryan & Wayne

[57] ABSTRACT

A suspension-correcting device for a motorcycle having at least one wheel-axle supporting arm pivoted on its chassis, the arm also supporting at least one disk-brake caliper, through which passes a brake disk fixed to a wheel mounted rotatably on the axle, and suspension parts and shock-absorbers connecting the arm to the chassis, wherein the brake caliper mounted on the supporting arm is capable of rotating relative to the supporting arm within limits allowed by a mechanical connection which connects the caliper to an upper reaction portion of the motorcycle chassis, the assembly being used for limiting the foward dive of the motorcycle during braking.

1 Claim, 4 Drawing Sheets

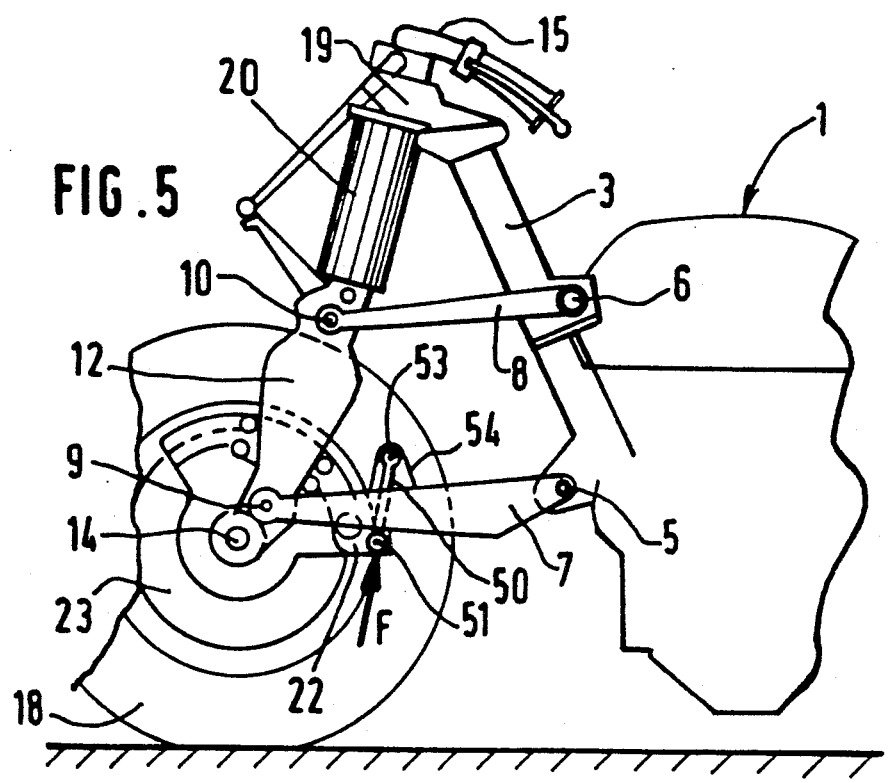
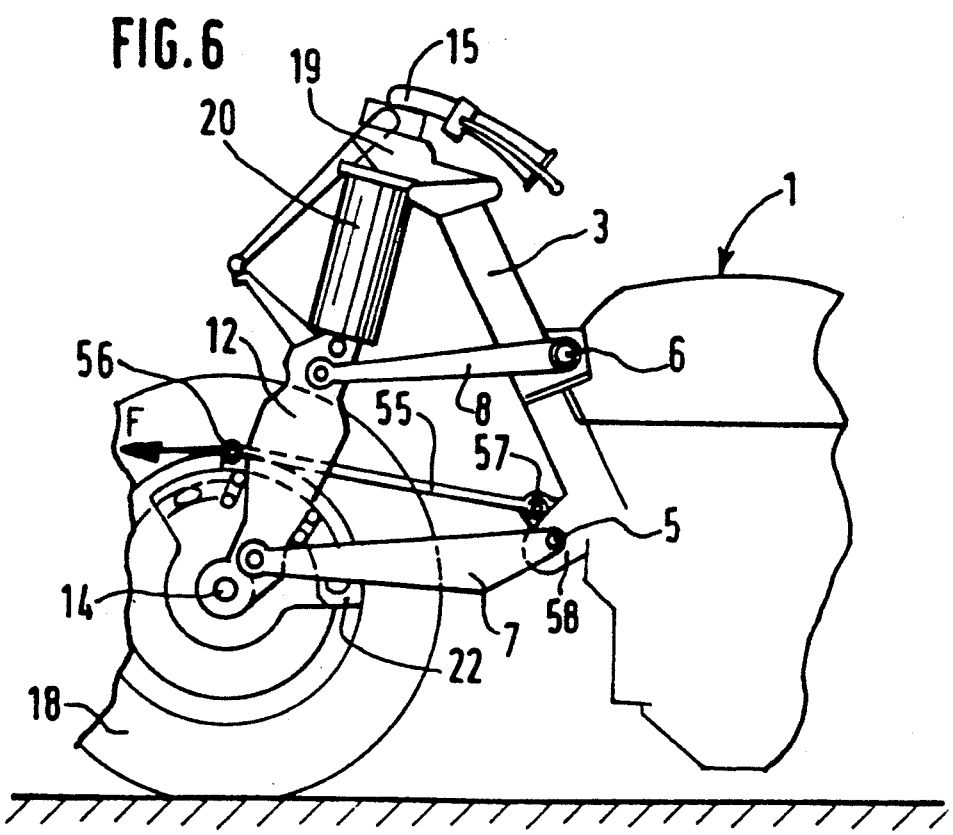

SUSPENSION-CORRECTIVE DEVICE DESIGNED ESPECIALLY FOR A MOTORCYCLE

This application is a continuation, of application Ser. No. 457,277, filed Dec. 27, 1989, abandoned.

The present invention relates to a suspension-correcting device designed especially for a motorcycle and intended for equipping either or both of the two wheels of this vehicle, this device comprising at least one wheel-axle supporting arm pivotally connected on its chassis, and at least one disk-brake caliper or an equivalent member, such as a brake flange cooperative respectively with a brake disk or an equivalent member, such as a brake drum, rigidly fixed to a wheel mounted rotatably on the said axle, and suspension and shock-absorbing means connecting the said arm to the chassis, the brake caliper being mounted on the supporting arm coaxially relative to the axle, while being capable of rotating relative to this supporting arm within the limits allowed by mechanical connections means which connect the caliper to a reaction portion of the motorcycle.

The essential function of the device is to prevent suspension reactions during braking, especially the dive or front dip effect, that is to say the compression of the suspension.

It is intended more particularly for equipping motor cycles having suspensions of the MacPherson type, in which the wheel axle is carried by a shock-absorber tube connected by means of a joint to part of the frame, the latter resting directly on a helical spring surrounding the shock-absorber tube and bearing on a shoulder of the latter.

For the front wheel of a motorcycle, an especially suitable suspension of the MacPherson type is described in the documents FR-A-2 594 781 et FR-A-2 601 641.

This front-wheel suspension comprises, for example, a supporting arm which, at its lower part, carries the wheel shaft of the axle and which is connected to the motorcycle chassis by means of two upper and lower suspension and guide arms, a suspension and shock-absorbing block being interposed and pivoted between the upper end of the supporting arm and a front nose integral with the motorcycle chassis.

Means are provided for allowing the supporting arm to rotate, under the action of a handlebar, about knuckles terminating the upper and lower guide arms.

For braking, at least one disk fixed to the front wheel and the axle thereof is arranged between the two brake pads of a brake caliper carried by the supporting arm.

According to the invention, the connection means preferably consist of a rigid connection member of the connecting-rod type which connects a pivoting joint provided on the caliper to a pivoting joint provided on the upper portion of the vehicle chassis.

Because the brake caliper can rotate through a small angle about the axle of the supporting arm, it becomes possible to impart some of the tangential braking force exerted on the brake caliper by the brake disk to the connecting rod forming the mechanical connection means and transmit these forces to the chassis of the motorcycle in opposition to the additional forward load-transfer forces caused by the deceleration of the motorcycle. Alternatively, it would be possible to transfer this fraction of the tangential braking force in such a way that it is added to the load-transfer forces, for example in order to allow the deceleration to be detected more effectively.

The invention also provides for equipping the rear wheel of the motorcycle in the same way, the rear brake caliper likewise being mounted rotatably on the axle of this rear driving wheel and being connected to a pivoting point on the chassis by means of a connecting rod.

Where an indirect connection between the caliper and the chassis of the motorcycle is concerned, the mechanical connection means are connected to the chassis of the motorcycle either by means of a suspension lever pivotally connected on the vehicle chassis or by means of at least one suspension arm rotatable about a pivot pin fixed to the vehicle chassis.

Where a direct connection to the chassis is concerned, the mechanical connection means can be pivoted at the upper part or the lower part of the chassis, depending on the load build-up or reduction effect to be obtained during braking.

When the device according to the invention is used on the front wheel of a motorcycle, the pivoting connection provided on the brake caliper is disposed on a radius relative to the wheel axle such that the force directed upwards and applied by the caliper to the rigid connecting member during braking is substantially equivalent to the force produced on the upper pivoting connection of said rigid connecting member by the supplemental load on the forward portion caused by deceleration of said motorcycle due to braking forces applied solely to the front wheel of the motorcycle.

According to yet another advantageous embodiment of the invention, the mechanical connection means forms a telescopic assembly capable of being deformed axially as far as limit stops and having the properties of a spring and/or of a shock-absorber.

The characteristics and advantages of the invention will emerge more clearly from the following description given purely by way of example, with reference to the accompanying drawings in which:

FIGS. 5 and 6 illustrate two alternative embodiments of the suspension for a front wheel according to FIG. 1.

Figure 7:
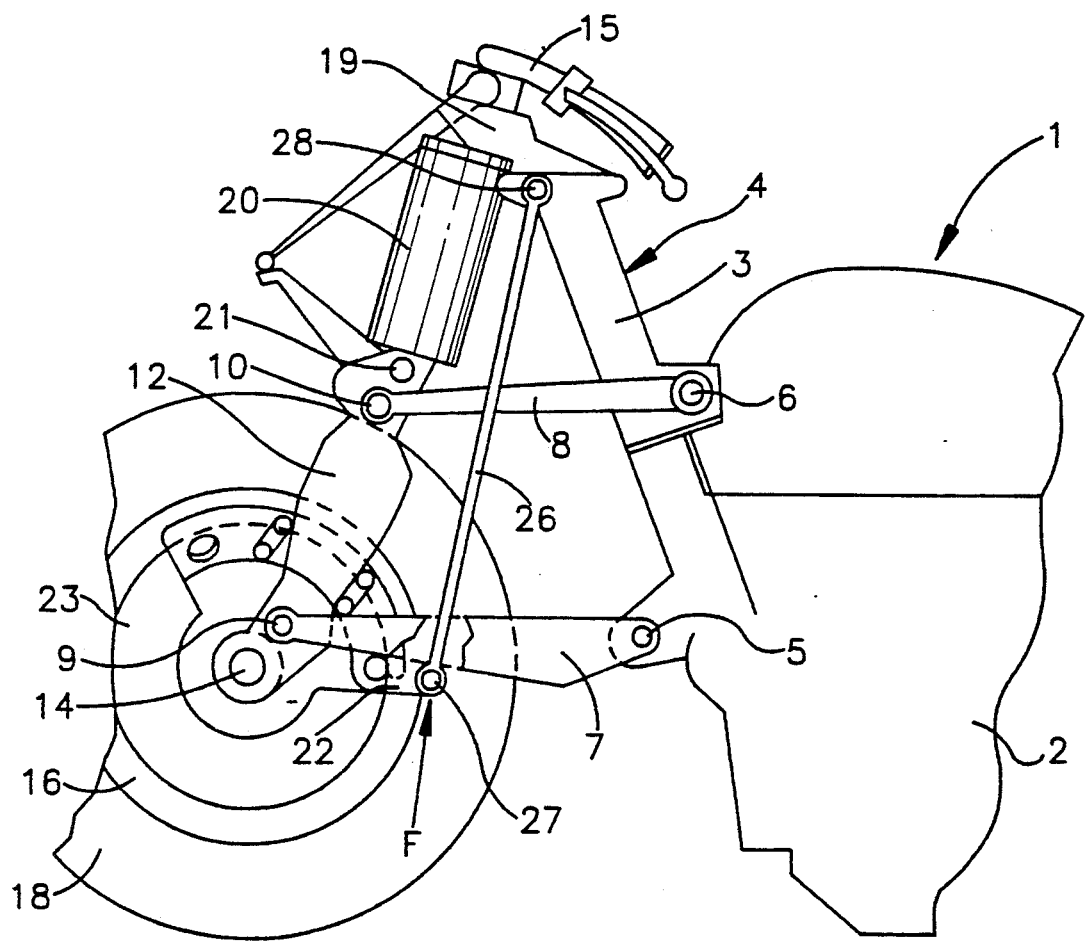
FIG. 7 is a diagrammatic view of the front part of a motorcycle equipped with the rigid suspension corrector of the invention.

In the chosen embodiment illustrated in FIG. 7, the motorcycle 1 comprises conventional means which will merely be mentioned: an engine unit 2 fixed to a chassis 3, the latter comprising, for example, a front strut 4, on which two guide arms, a lower one 7 and an upper one 8 pivot, these being pivoted at their other end on a single supporting arm 12 carrying a front-wheel shaft or axle 14 on which the front wheel 16, together with its pneumatic tire 18, is mounted rotatably by means of bearing blocks or roller bearings.

The supporting arm 12 connected to a handlebar 15 by means of a suitable linkage has an arcuate shape transversely, surrounds the wheel 16 and its pneumatic tire 18 laterally and is also connected, via a shock-absorbing and suspension block 20, to a front nose 19 of the chassis 4 by means of a rubber shock mount. A pivot pin 21 connecting this block 20 to the arm 12 allows variations in the inclination of the supporting arm relative to the said block.

In the conventional way, the supporting arm 12 carries at least one disk-brake caliper 22, through which passes a brake disk 23 fixed to the wheel 16 and to the shaft 14.

Figure 2:
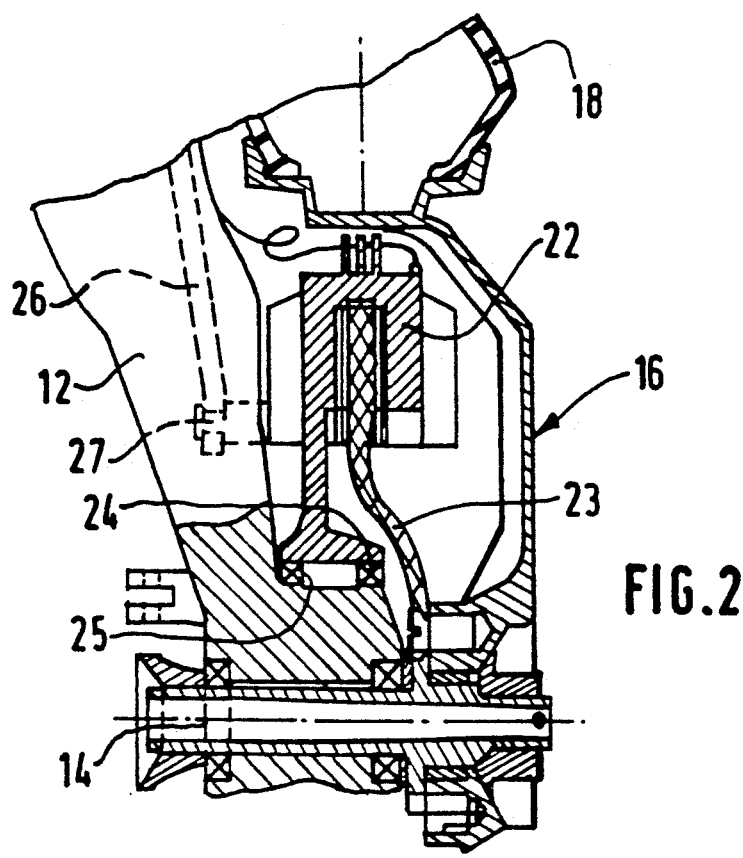
FIG. 2 is a detailed half cross-sectional view of the suspension of FIG. 1.

According to the invention, the brake caliper 22 is mounted rotatably, by means of bearing blocks or roller bearings 24, on a bearing surface of the supporting arm 12 coaxial relative to the shaft 14 (FIG. 2), and a rigid connecting rod 26 pivoted on the caliper 22 at one of its ends at 27 is pivotally connected at its other end, at 28, on the upper part or nose 19 of the front strut 4 of the chassis 3. This connecting rod transmits to the chassis 3 reaction forces which arise during braking.

Figure 3:
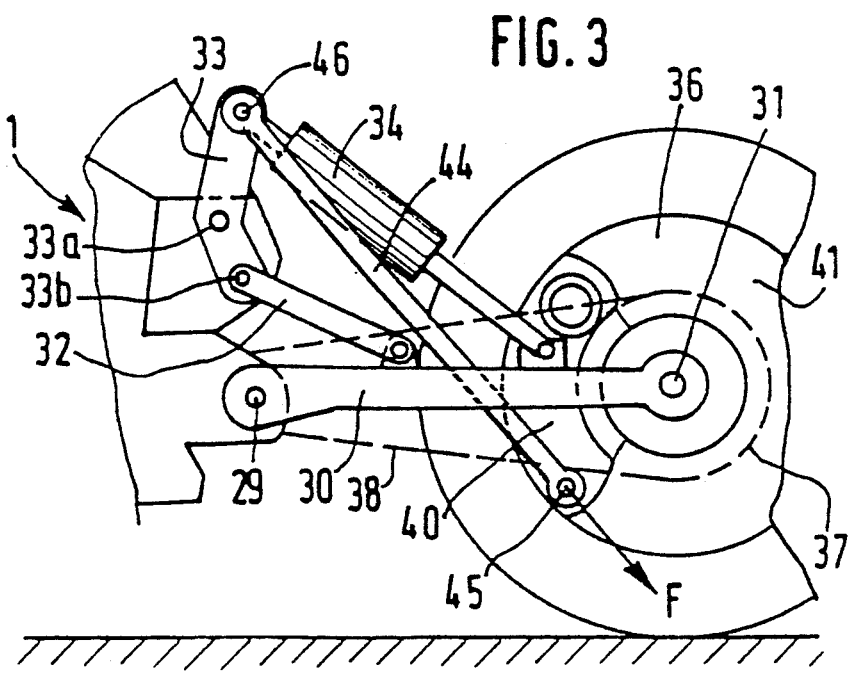
FIG. 3 is a diagrammatic view of the rear part of a motorcycle equipped with a suspension corrector according to the invention.
Figure 4:
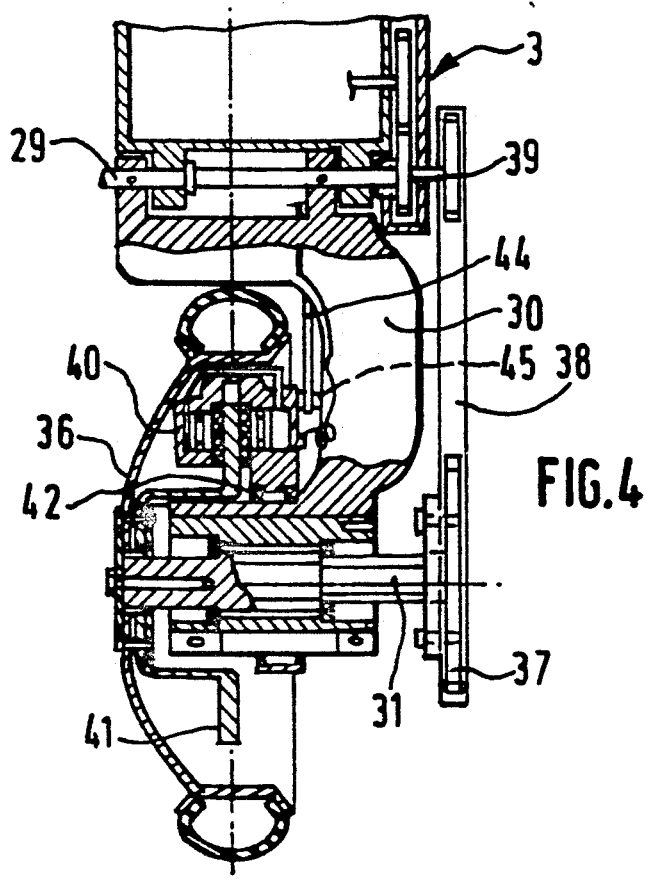
FIG. 4 is a sectional bottom view of the suspension of FIG. 3.

FIGS. 3 and 4 illustrate the use of the device according to the invention for the rear wheel of a motorcycle: of course, the latter can also be equipped with the device just described on its front wheel.

Pivoted on the chassis 3 about a pivot pin 29 is a fork or single supporting arm 30 carrying a rear-wheel shaft or axle 31 by means of bearing blocks. This arm is also connected to the chassis in a known way by means of a connecting rod 32, by means of a suspension lever 33 pivoted on the rear of the chassis 3 at 33a and on the connecting rod 32 at 33b and by means of a suspension and shock-absorbing block 34 pivoted on the single arm 30.

The wheel 36, by means of the shaft 31 on which it is fastened, is fixedly connected to a toothed drive sprocket 37 connected to the output shaft of the engine unit 2 by means of a chain 38.

A brake disk 41 fixed to the wheel 36 passes through at least one disk-brake caliper 40. As before, this caliper 40 is mounted rotatably by means of bearing blocks 42 on a bearing surface of the arm 30 coaxial relative to the shaft 31, and a link 44 pivoted on the brake caliper 40 and on the chassis 3 at its respective ends 45, 46 connects these two elements. Here again, this direct connection between the brake caliper and the chassis makes it possible to reduce the braking reactions and ensures better seating or trim stability during braking.

Figure 1:
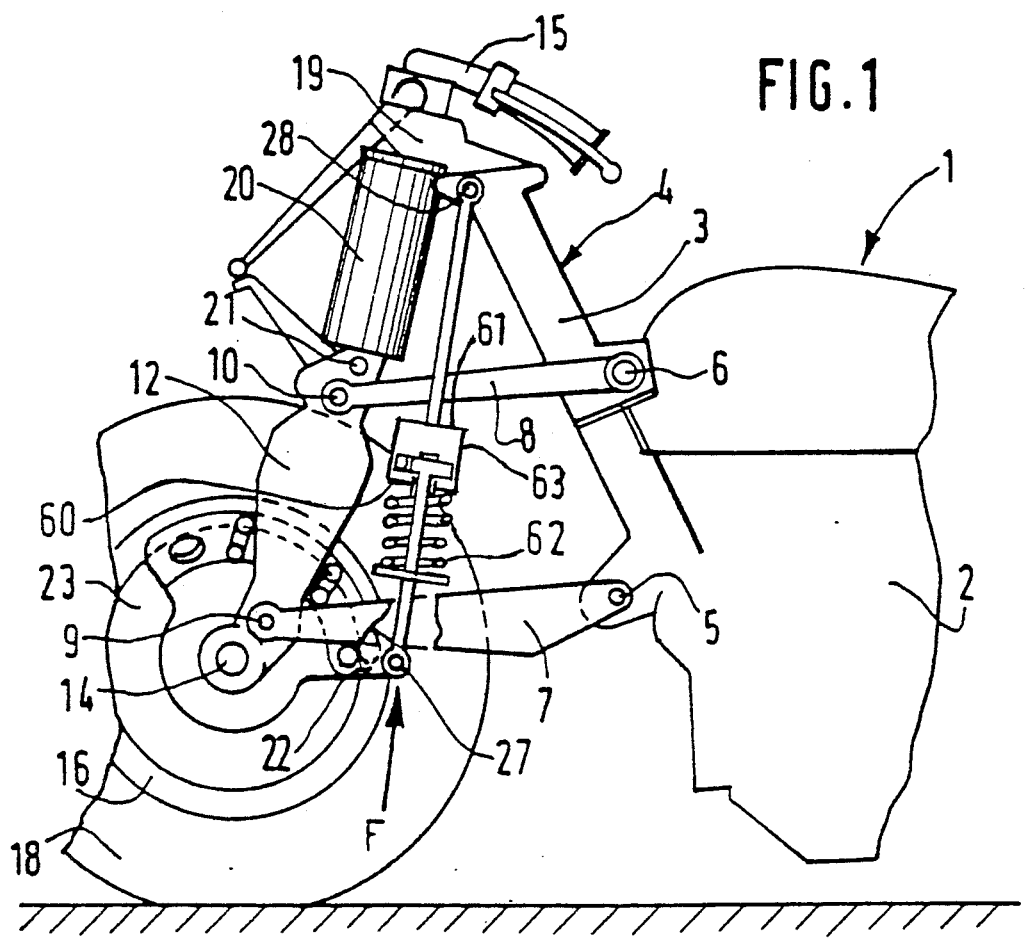
FIG. 1 is a diagrammatic view of the front part of a motorcycle equipped with a suspension corrector comprising a telescopic assembly.

FIGS. 5 and 6 show two alternative embodiments for equipping the front wheel of a motorcycle by means of the correcting device according to the invention. In both alternative versions, the suspension, steering and braking elements are similar to those of FIG. 1 (and of FIG. 2) and have been given the same reference numbers. They will not be described again.

In the alternative version of FIG. 5, a short link 50 is pivoted, on the one hand, on the brake caliper 22 at 51 and, on the other hand, at 53 on a lug 54 which is integral with the lower suspension arm 7 which extends on the opposite side to the joint 5!. The link 50 thus has a sufficient length to absorb the movements of the caliper 22 relative to the arm 7 without any appreciable variation in the inclination.

In the alternative version of FIG. 6, a connecting rod 55 is pivoted, on the one hand, on the brake caliper 22 at 56 and, on the other hand, at 57 on a lug 58 integral with the chassis 3 and near the pivoting point 5 of the lower suspension arm 7.

It goes without saying that, in both cases, the brake calipers are rotable about the axis of the front axle. These arrangements also make it possible to reduce the braking reactions.

In the examples described, the connecting rods and links 26, 44, 50 and 55 are rigid. It is possible to replace this rigid connection by a telescopic assembly, shown in FIG. 1 and capable of being deformed axially as far as limit stops 61, 62 and combining an outer spring 62 and an inner shock-absorber 63.

The functioning of the device just described will now be examined. If reference is made to FIG. 1, it will be seen that, during normal unbraked running of the motorcycle 1, the suspension moves in response to undulations of the roadway, thereby compressing the spring of the suspension block 20 to a greater or lesser extent. The distance between the pivot pin 28 of the connecting rod 26 on the chassis 3 and the brake caliper 22 will therefore vary. The length of the connecting rod 26 being constant, the alternated movements of the nose 19 of the front strut 4 of the chassis 3 will each time cause the brake caliper 22 to rotate about the front wheel axle 14.

If the motor-cycle rider exerts a braking action, the brake caliper 22 rubbing against the disk 23 by means of its friction pads (not shown) receives from the latter disk a tangential frictional force F which (increased or reduced as an inverse function of the radius of the pivoting joint 27 relative to the axis of the wheel axle 14) is transmitted to the connecting rod 26 and thence to the nose 19 of the strut 4 of the motor-cycle chassis which is thus subject to increased load as a result of the forward load transfer caused by the deceleration of the motorcycle. To benefit from a stable suspension, the joint 27 can be positioned on a radius which, relative to the axis of the axle 14, is such that the force directed towards the top of the connecting rod 26 during braking is slightly less than or equal to the force generated at 28 as a result of the forward load transfer attributable to the deceleration of the motorcycle.

Moreover, the deceleration of the motorcycle is not always proportional to the tangential braking force exerted in reaction to the force F, because it also depends on the braking force exerted on the rear wheel of the motorcycle. In fact, according to the arrangement illustrated in FIGS. 1 and 2, during braking the connecting rod 26 produces the same effect as a temporary hardening of the suspension which, although considerable overloads are exerted on the front axle, thus does not undergo any additional compression during braking. It is equally possible to compensate or balance by the means of the force F which is exerted on the forward position of the motorcycle only the excess load on the front portion caused by the deceleration of the whole motorcycle (with the driver and the possible passengers) and which is due to the sole braking forces exerted on the motorcycle front wheel. Any rear brake application then produces a front suspension compression stressing to the driver he is utilizing the rear wheel's available adhesion, braking thus leading to a risk of loss of adhesion at the rear wheel and being dangerous. The most common adjustment of the balance for the sole front braking application consists in balancing forward load transfer that is produced by front brake application on the motorcycle under normal load conditions, i.e. with only the driver and for the usual mean friction coefficient (with the brake linings or pads slightly heated) for the front brake. The long connecting rod 26 moreover constitutes a supplementary damping member for oscillations and vibrations in the steering of the motorcycle during braking, because of friction at its pivoting ends for which it has to be understood that the pivoting connections are of the universal joint type, that is to say they comprise a ball and socket joint.

In the embodiment shown in FIG. 5, the tangential force F is transmitted to the lower suspension arm by means of the lug 54, but it does not exert on the motorcycle chassis 3 any relieving or releasing effect capable of reducing the additional compression of the spring of the block 20 during braking.

In the embodiment illustrated in FIG. 6, the connecting rod 55 is subjected to a pull under the effect of the force F, and this pull is transmitted directly to the engine unit via the lug 58, without causing any appreciable effect on the suspension of the front wheel which, nevertheless, is damped a little more effectively during braking because the rotations of the arm 7 cause a lesser rotation of the caliper 22 under the reaction effect of the link 55.

Finally, in the embodiment of FIG. 3, it will be seen that the tangential force F tends, by means of the link 44, to pull the pivoting connection 46 of the suspension spring 34 downwards, that is to say to subject the suspension spring of the block 34 to greater compression. This arrangement makes it possible to increase the compression of the rear suspension (normally relieved under the same conditions) during braking, thus effectively opposing the dive or front dip movement of the motorcycle as a whole.

In the instance (not shown), in which the connecting rods or links 26 (or 44 or 50 or 55) forms a are replaced by spring/shock-absorber assembly 62, 63 subjected to a prestressing force and capable of coming to a stop, after a spring-compression and shock-absorbing stroke, the reactions of the braking torque on the suspension are less and are transmitted completely only after a shock-absorbing lag. Everything therefore happens as if the rider were first forewarned of the compression of his front suspension during braking and then, under the effect of the transmission connecting rod coming to a stop at the end of its axial stroke, saw the suspension stabilize, free of additional compressions or expansions attributable to the "dive" or front dip effect. According to another advantageous result of the embodiment of the braking equipment according to the present invention, by virtue of the rotary mounting of the brake calipers it is possible to arrange these, relative to the wheel or relative to the single front or rear supporting arm 12 or 30, in locations where it was previously impossible to accomodate these brake calipers and keep them in position.

The device according to the invention has been described for a brake caliper straddling a brake disk, though it is clear that it can be used for types of brakes other than the disk brake, especially for drum brakes where the function of the brake caliper absorbing the reaction force to the friction of the disk is performed by the supporting flange of the brake cylinders and shoes carrying the brake linings, this flange then being mounted rotatably relative to the supporting arm and being connected to the motorcycle chassis by means of a connecting rod.

Of course, the present invention is not limited to the embodiments described and illustrated, and it is capable of many alternative versions accessible to an average person skilled in the art, without departing from the spirit of the invention.

I claim:

1. A correcting device for the front suspension of a motorcycle including a chassis having an upper portion with a front nose, a front wheel rotatably supported in a wheel axle, and a brake disk fixed with said front wheel, said correcting device comprising:

a wheel-axle supporting arm pivotally connected at its upper portion to the chassis by a suspension and shock-absorbing means to control the movements of said front wheel relative to said chassis;

at least one disk-brake caliper cooperating with said brake disk, said caliper being rotatively mounted on the supporting arm coaxially with the wheel axle;

a rod member pivotally connected at a first end to the front nose of the chassis and at a second end to the disk-brake caliper such that the said caliper produces on said rod member, during braking, a force directed upwards, wherein a radius, relative to the wheel axle, of the connection of the second end of the rod member to the disk-brake caliper, has a selected length such that the force directed upwards is substantially equivalent to an opposite force produced on said front nose by a supplemental load exerted on a forward portion of the motorcycle due to deceleration of said motorcycle, the supplemental load is the load produced by braking when said braking is applied solely to the front wheel of the motorcycle, whereby any significant rear wheel braking produces a front suspension compression which indicates to a motorcycle driver that rear wheel braking is significant, and wherein the front wheel-axle supporting arm is pivotally connected to a lower guide arm and pivotally connected to an upper guide arm and the lower guide arm and upper guide arm are pivotally connected to a front strut of the chassis, whereby said guide arms have a stabilizing effect during front suspension compression.

* * * * *